United States Patent
Musil

(10) Patent No.: US 11,290,039 B2
(45) Date of Patent: Mar. 29, 2022

(54) ELECTRIC MOTOR DRIVE APPARATUS AND METHOD THEREFOR

(71) Applicant: NXP USA, Inc., Austin, TX (US)

(72) Inventor: Jaroslav Musil, Breclav (CZ)

(73) Assignee: NXP USA, Inc., Austin, TX (US)

( * ) Notice: Subject to any disclaimer, the term of this patent is extended or adjusted under 35 U.S.C. 154(b) by 114 days.

(21) Appl. No.: 15/481,608

(22) Filed: Apr. 7, 2017

(65) Prior Publication Data

US 2018/0091075 A1    Mar. 29, 2018

(30) Foreign Application Priority Data

Sep. 28, 2016 (EP) .................................... 16191050

(51) Int. Cl.
*H02P 6/28* (2016.01)
*H02P 27/08* (2006.01)
*H02P 6/08* (2016.01)
*H02P 21/00* (2016.01)

(52) U.S. Cl.
CPC .................. *H02P 6/28* (2016.02); *H02P 6/08* (2013.01); *H02P 21/0085* (2013.01); *H02P 27/08* (2013.01); *H02P 2201/03* (2013.01); *H02P 2201/09* (2013.01); *H02P 2201/15* (2013.01)

(58) Field of Classification Search
CPC ........... H02P 6/28; H02P 6/08; H02P 21/0085
USPC ......................................................... 318/400
See application file for complete search history.

(56) References Cited

U.S. PATENT DOCUMENTS

| 7,378,808 B2* | 5/2008 | Kuras | H01M 10/482 318/139 |
| 9,843,191 B2* | 12/2017 | Smith | H02J 3/383 |
| 9,970,405 B2* | 5/2018 | Garrard | F02P 5/1514 |
| 2005/0231183 A1* | 10/2005 | Li | H02M 3/33507 323/299 |
| 2005/0263329 A1* | 12/2005 | Kuras | B60W 20/10 180/65.1 |
| 2007/0114962 A1* | 5/2007 | Grbovic | H02M 1/4225 318/772 |
| 2010/0133904 A1* | 6/2010 | Klodowski | H02J 3/50 307/24 |
| 2011/0031943 A1* | 2/2011 | Green | H02P 27/08 323/205 |
| 2011/0140642 A1* | 6/2011 | Kono | H02P 27/06 318/139 |
| 2011/0241580 A1* | 10/2011 | Winterhalter | H02P 27/06 318/400.3 |

(Continued)

FOREIGN PATENT DOCUMENTS

EP   2322374 A1   5/2011
EP   3043467 A1   1/2015

*Primary Examiner* — Muhammad S Islam
*Assistant Examiner* — Devon A Joseph

(57) ABSTRACT

An electric motor drive apparatus comprising a voltage converter component arranged to receive a supply voltage signal and output a bus voltage signal, and a motor driver component arranged to receive the bus voltage signal and generate at least one drive signal for an electric motor from the bus voltage signal. The motor driver component is arranged to output a bus voltage feedback signal to the voltage converter component. The voltage converter component is arranged to regulate a voltage level of the bus voltage signal based at least partly on the bus voltage feedback signal output by the motor driver component.

15 Claims, 6 Drawing Sheets

(56) References Cited

U.S. PATENT DOCUMENTS

| | | | | |
|---|---|---|---|---|
| 2015/0002058 A1* | 1/2015 | Kashihara | ............ | H02P 6/08 |
| | | | | 318/400.3 |
| 2015/0042255 A1* | 2/2015 | Ried | ............ | H02P 29/40 |
| | | | | 318/504 |
| 2017/0018960 A1* | 1/2017 | Beg | ............ | H02J 7/0068 |
| 2017/0126153 A1* | 5/2017 | Lepka | ............ | H02P 6/18 |
| 2017/0302200 A1* | 10/2017 | Marcinkiewicz | ....... | H02M 1/32 |
| 2017/0349059 A1* | 12/2017 | Xu | ............ | B60L 15/025 |
| 2017/0366127 A1* | 12/2017 | Tsoumas | ............ | H02P 27/06 |
| 2019/0344824 A1* | 11/2019 | Takase | ............ | H02M 7/53871 |

\* cited by examiner

ELECTRIC MOTOR DRIVE APPARATUS AND METHOD THEREFOR

FIELD OF THE INVENTION

This invention relates to an electric motor drive apparatus and a method therefor.

BACKGROUND OF THE INVENTION

FIG. 1 illustrates a simplified block diagram of a conventional electric motor drive apparatus 100 in which a motor driver 110 is arranged to output a drive signal 115 to an electric motor 120. In particular, the motor driver 110 is arranged to receive a DC bus voltage 135 provided by a bus voltage converter 130, and to convert the DC bus voltage 135 into an electrical drive signal 115 for driving the electric motor 120.

For the electric motor (in this example a permanent magnetic synchronous motor) 120 to be able to generate torque, it is necessary for current to be flowing through the windings of the electric motor 120, since the torque is proportional to the torque-generating current $I_q$ within the motor windings. The torque-generating current $I_q$ may be derived from the following formula:

$$u_q = L_q \frac{di_q}{dt} + Ri_q + \omega_r L_d i_d + \omega_r \Psi \qquad \text{Equation 1}$$

$$u_d = L_d \frac{di_d}{dt} + Ri_d + \omega_r L_q i_q \qquad \text{Equation 2}$$

where $u_q$ and $u_d$ are the voltage in the q- and d-axis applied on motor's terminals, $i_q$ and $i_d$ are the q- and d-axis currents flowing into the motor, $L_q$ and $L_d$ are q- and d-axis inductances of the stator windings, $\omega_r$ is the rotor angular speed and $\Psi$ is the permanent magnet flux. R is the motor winding resistance. For the stationary operation the first member of the right side can be omitted to simplify the equation. Similarly, the third member can be omitted due to low influence. The last member of Equation 1 ($\omega_r \Psi$) is the generated BEMF (Back ElectroMagnetic Force). The q- and d-axis voltages are limited by the maximum applicable DC bus voltage $V_{drive}$ as per the following equation:

$$V_{drive} \geq \sqrt{u_q^2 + u_d^2} \qquad \text{Equation 3}$$

If the d-axis voltage is kept zero, i.e. the motor excitation is not reduced or increased, the maximum q-axis voltage applied on the motor's terminals can be as high as the maximum applicable DC bus voltage. For the same case, the d-axis current will be zero and the equation for the q-axis current can be simplified to:

$$I_q \leq \frac{V_{drive} - V_{BEMF}}{R} \qquad \text{Equation 4}$$

where $V_{drive}$ is the maximum applicable voltage (depending on the used space vector modulation) of the drive signal 115, $V_{BEMF}$ is the BEMF voltage generated by the electric motor 120 as it rotates, and R is the internal resistance of the armature's windings within the electric motor 120. At a certain rotational speed of the electric motor 120, the BEMF voltage $V_{BEMF}$ generated by the electric motor 120 as it spins equals the voltage $V_{drive}$ of the drive signal 115, at which point the rotational speed of the electric motor 120 cannot increase any further. The BEMF voltage $V_{BEMF}$ generated by the electric motor 120 is proportional to the flux within the electric motor 120 and the rotational speed of the electric motor 120.

Speed control is typically achieved through pulse-width modulation (PWM) of the drive signal 115, which allows the average voltage $V_{drive}$ of the drive signal 115 to be varied, which in turn allows the point at which the BEMF voltage $V_{BEMF}$ generated by the electric motor 120 equals the voltage $V_{drive}$ of the drive signal 115 to be varied. PWM control techniques provide a power efficient speed control mechanism. However, PWM control mechanisms suffer from current rippling, distortion and discontinuity at low currents.

For applications that require high torque, a high drive current $I_{drive}$ is desired within the drive signal 115 in order to provide a high torque-generating current $I_q$ within the electric motor 120. At low rotational speeds, the low average voltage $V_{drive}$ of the drive signal 115 compensates for the high drive current $I_{drive}$ in terms of electrical power supplied to the electric motor 120 (power=voltage*current). However, increasing the average drive voltage $V_{drive}$ in order to increase the rotational speed of the electric motor 120 results in a significant increase in the electrical power supplied to the electric motor 120.

Conventionally, in order to achieve high rotational speeds whilst limiting the electrical power desired, field weakening is used whereby the excitation flux within the electric motor 120 is reduced in order to reduce the BEMF voltage generated by the electric motor 120 as it spins. In this manner, the electric motor 120 is able to achieve a high rotational speed before the BEMF voltage $V_{BEMF}$ generated by the electric motor 120 equals the voltage $V_{drive}$ of the drive signal 115, is able to achieve a higher rotational speed for a particular voltage $V_{drive}$ of the drive signal 115.

However, a problem with such field weakening techniques is that by reducing the excitation flux within the electric motor 120 in order to achieve higher rotation speeds, the torque generated by the electric motor 120 is also reduced. Furthermore, the excitation flux is typically reduced by applying negative current in the d-axis into the windings of the electric motor 120, which leads to an increase in thermal losses within the electric motor 120. The higher the absolute value of the d-axis current and voltage, the lower space for the q-axis voltage and current as defined by the following equations:

$$u_q \leq \sqrt{V_{drive}^2 - u_d^2} \qquad \text{Equation 5}$$

$$i_q \leq \sqrt{I_{max}^2 - i_d^2} \qquad \text{Equation 6}$$

where $I_{max}$ is the maximum allowed current for the motor, going beyond which may damage the motor.

SUMMARY OF THE INVENTION

The present invention provides an electric motor drive apparatus and a method of generating at least one drive signal for an electric motor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to FIG. 1 illustrates a simplified block diagram of a conventional electric motor drive apparatus.

DETAILED DESCRIPTION OF THE PREFERRED EMBODIMENTS

Figure 2:
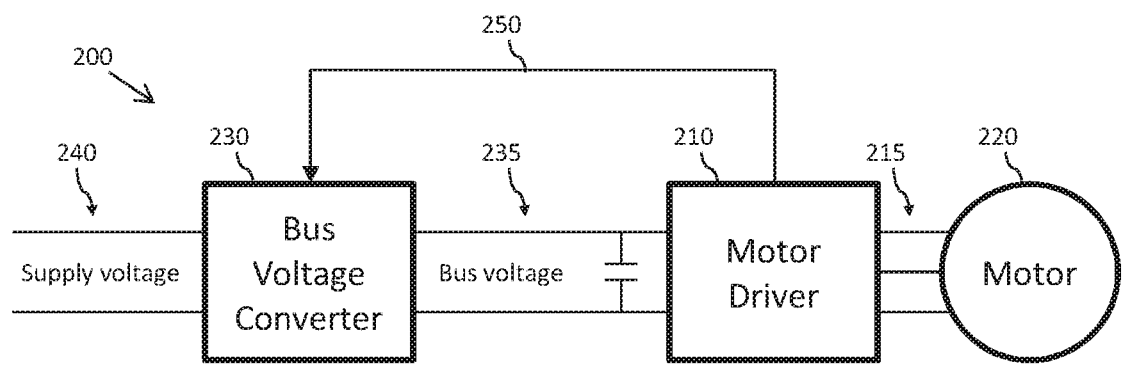
FIG. 2 illustrates a simplified block diagram of an example embodiment of an electric motor drive apparatus.

FIG. 2 illustrates a simplified block diagram of an example embodiment of an electric motor drive apparatus 200 in which a motor driver component 210 is arranged to output drive signals 215 to an electric motor 220. In particular, the motor driver component 210 is arranged to receive a bus voltage signal 235 provided by a voltage converter component 230, and to convert the bus voltage signal 235 into drive signals 215 for driving the electric motor 220. The motor driver component 210 is further arranged to output a bus voltage feedback signal 250 to the voltage converter component 230, and the voltage converter component 230 is arranged to regulate a voltage level of the bus voltage signal 235 in response to the bus voltage feedback signal 250 output by the motor driver component 210.

The electric motor 220 may comprise any suitable electric motor, such as a permanent magnet synchronous motor, induction motor, BLDC motor, etc. The motor driver component 210 illustrated in FIG. 2 is arranged to generate a 3-phase drive signal 215 to the electric motor 220 consisting of three drive current signals generated from the bus voltage signal 235. For example, the motor driver component 210 may be arranged to (independently) perform pulse-width modulation (PWM) of the bus voltage signal 235 to generate each of the three drive signals 215. The voltage converter component 230 may comprise any suitable type of voltage converter capable of generating a suitable bus voltage signal 235, for example a DC/DC converter, an AC/DC converter, a power factor correction (PFC) unit, etc. Accordingly, the voltage converter component 230 may receive a supply voltage signal 240 comprising a DC voltage signal, an AC voltage signal or a rectified AC voltage signal as appropriate for the voltage converter component 230.

In the example embodiment illustrated in FIG. 2, the motor driver component 210 is arranged to output a bus voltage feedback signal 250 to the voltage converter component 230, and the voltage converter component 230 is arranged to regulate a voltage level of the bus voltage signal 235 based (at least partly) on the bus voltage feedback signal 250 output by the motor driver component 210. In this manner, and as described in greater detail below, the voltage converter component 230 is able to vary the voltage level of the bus voltage signal 235 in response to the bus voltage feedback signal 250, providing greater flexibility in the way in which the electric motor 220 is driven.

For example, the motor driver component 210 may be arranged to output the bus voltage feedback signal 250 comprising an indication of a power aspiration (i.e. a desired power output) for the electric motor drive signal 215. Such a voltage feedback signal 250 may comprise an indication of desired (cumulative) voltage levels and/or currents for the three (3-phase) drive signals 215 output to the electric motor 220. The voltage converter component 230 may then be arranged to increase the voltage level of the bus voltage signal 235 upon the bus voltage feedback signal 250 indicating an increased power aspiration for the electric motor drive signal 215, and decrease the voltage level of the bus voltage signal 235 upon the bus voltage feedback signal 250 indicating a reduced power aspiration for the electric motor drive signal 215.

Figure 3:
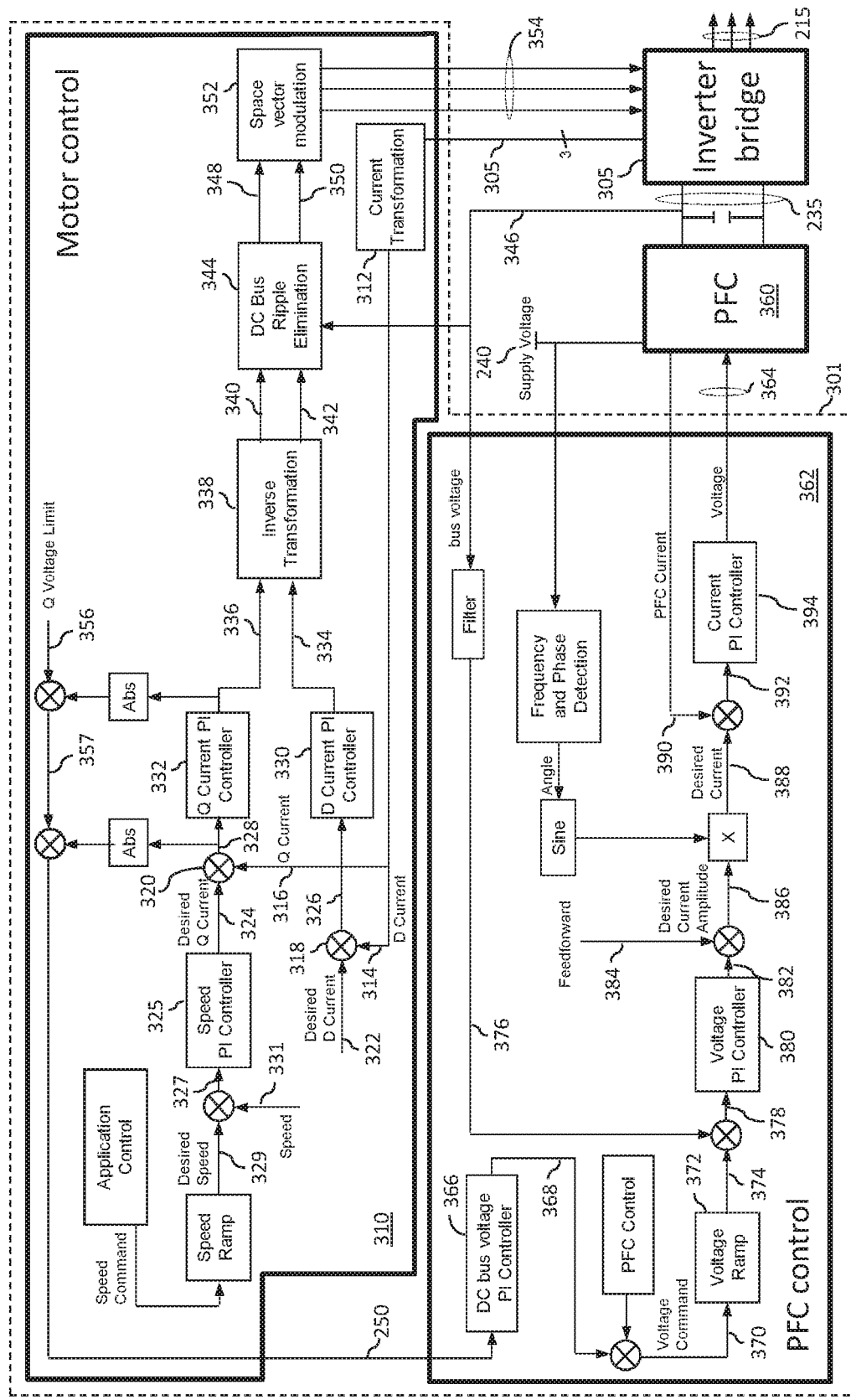
FIG. 3 schematically illustrates a more detailed example of an embodiment of the electric motor drive apparatus of FIG. 2.
Figure 4:
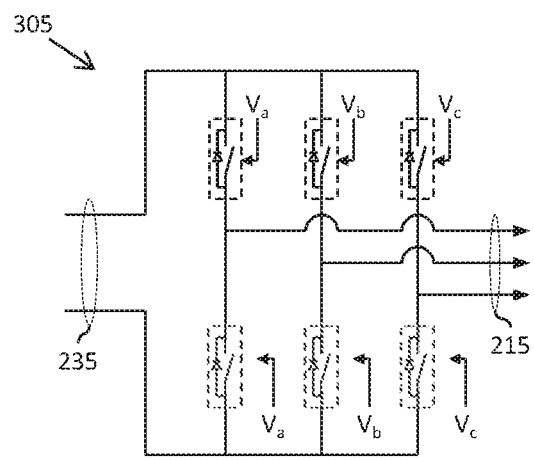
FIG. 4 schematically illustrates an example implementation of a 3-phase inverter.

Referring now to FIG. 3, there is schematically illustrated a more detailed example of an embodiment of the electric motor drive apparatus 200. In the example illustrated in FIG. 3, the motor drive component 210 comprises a 3-phase inverter 305 arranged to receive the bus voltage signal 235, and to perform pulse-width modulation (PWM) of the bus voltage signal 235 in accordance with 3-phase inverter controls signals 354 to generate each of the three drive signals 215. FIG. 4 schematically illustrates an example implementation of the 3-phase inverter 305. Such a 3-phase inverter is well-known in the art and as such requires no further explanation as to its operation. However, for completeness, the 3-phase inverter 305 illustrated in FIG. 4 comprises three pairs of switches, each pair of switches controllable by one of the inverter controls signals 354 (illustrated as $V_a$, $V_b$ and $V_c$ in FIG. 4) to drive a respective drive signal 215 from either a high voltage or low voltage line of the bus voltage signal 235.

Referring back to FIG. 3, the motor drive component 210 further comprises a motor control module 310 for generating the 3-phase inverter controls signals 354. In the illustrated example, the motor control module 310 is further arranged to output the bus voltage feedback signal 250. In some example embodiments, the motor control module 310 may be implemented within computer program code executed on a processing module, for example a microprocessor device, a microcontroller unit, a digital signal processor, etc.

Figure 1:
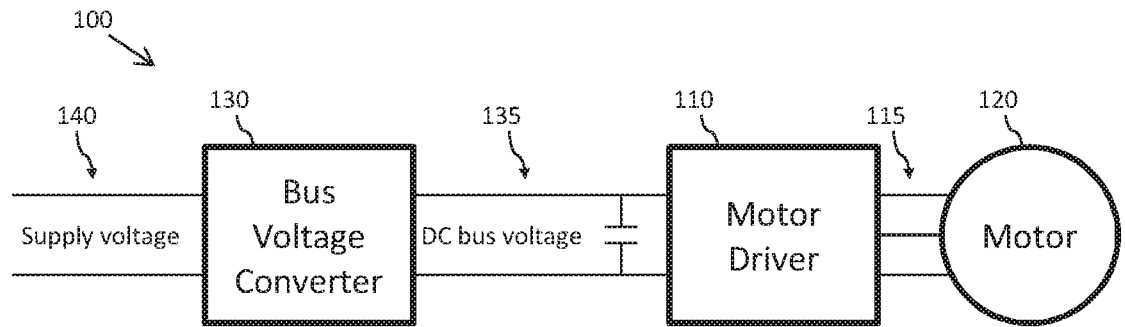

In the illustrated example, the voltage converter component 230 comprises a voltage regulator unit, which in the illustrated example consists of a PFC regulator unit 360, and a (PFC) controller module 362. The PFC regulator unit 360 is arranged to receive the supply voltage signal 240, and to generate therefrom the regulated bus voltage signal 235 in accordance with control signal 364 output by the PFC controller module 362. The PFC controller module 362 is arranged to receive the bus voltage feedback signal 250 output by the motor control module 310, and to control the PFC regulator unit 360 (via the control signal 364) to regulate the voltage level of the bus voltage signal 235 based at least partly on the bus voltage feedback signal 250. In some example embodiments, the PFC controller module 362 may be implemented within computer program code executed on a processing module, for example a microprocessor device, a microcontroller unit, a digital signal processor, etc. In some example embodiments, the motor control module 310 and the PFC controller module 362 may be implemented within computer program code executing on the same processing module, such as illustrated generally at 301 in FIG. 1.

Figure 5:
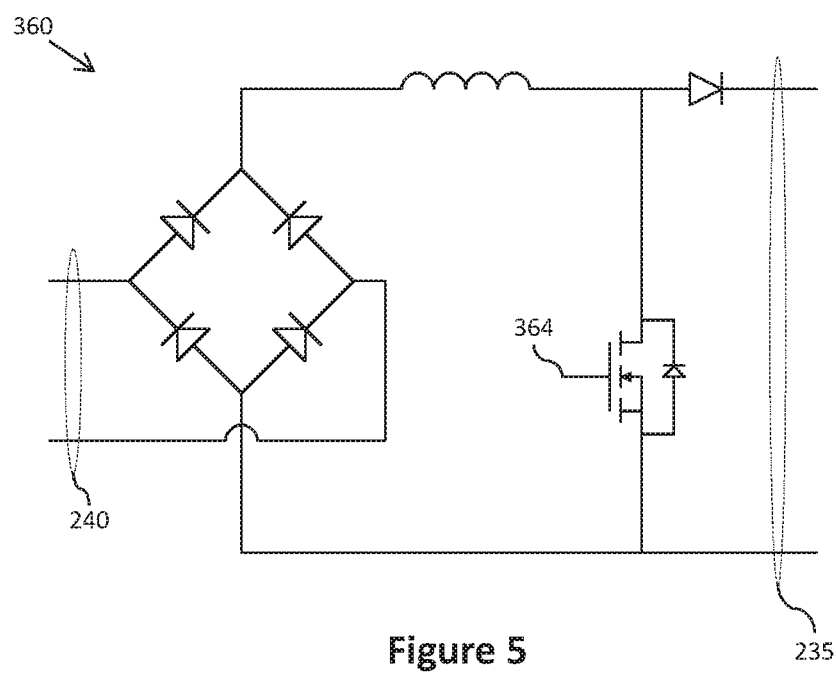
FIG. 5 schematically illustrates an example implementation of a PFC regulator unit.

FIG. 5 schematically illustrates an example implementation of the PFC regulator unit 360. Such a PFC regulator unit 360 is well-known in the art and as such requires no further explanation as to its operation. However, for completeness the PFC regulator unit 360 illustrated in FIG. 5 comprises a diode rectifier and boost converter circuit controlled by, in the illustrated example, the PWM signal 364 generated by the PFC control block 362 and arranged to provide power factor correction to the bus voltage signal 235 output by the PFC regulator unit 360.

Referring back to FIG. 3, the motor control module 310 of the motor drive component 210 is arranged to receive 3-phase current values $I_a$, $I_b$, $I_c$, illustrated generally at 305, representative of the currents of the three drive signals 215 output by the 3-phase inverter 305 of the motor driver component 210 to the electric motor 220. In the example illustrated in FIG. 3, the motor control module 310 comprises a current transformation component 312 arranged to transform the 3-phase current values $I_a$, $I_b$, $I_c$ 305 into rotating reference frame (D current and Q current) values $I_d$ 314 and $I_q$ 316. For example, the rotating reference frame values $I_d$ 314 and $I_q$ 316 may be computed based on a Park transformation expressed by Equations 7 and 8 below:

$$I_d = I_\alpha * \cos(\theta) + I_\beta * \sin(\theta) \qquad \text{Equation 7}$$

$$I_q = I_\beta * \cos(\theta) - I_\alpha * \sin(\theta) \qquad \text{Equation 8}$$

where $I_\alpha$ and $I_\beta$ represent the Clark transformation of the 3-phase current values $I_a$, $I_b$, $I_c$ 305 to a two-axis orthogonal stationary reference frame, which may be expressed by Equations 9 and 10 below:

$$I_\alpha = \frac{2}{3}(I_a) - \frac{1}{3}(I_b - I_c) \qquad \text{Equation 9}$$

$$I_\beta = \frac{1}{\sqrt{3}}(I_b - I_c) \qquad \text{Equation 10}$$

The computed rotating reference frame values $I_d$ 314 and $I_q$ 316 are provided to mixer components 318, 320, which are arranged to mix the computed rotating reference frame values $I_d$ 314 and $I_q$ 316 with corresponding desired rotating reference frame values 322, 324 to generate respective D current and Q current error values 326, 328 representative of a difference between each of the computed rotating reference frame values $I_d$ 314 and $I_q$ 316 and the respective desired D current and Q current values 322, 324. In the example illustrated in FIG. 3, the desired Q current reference frame value 324 is output by a speed PI controller 325 based on a motor speed error value 327 representative of a difference between a desired motor speed value 329 and a measured speed value 331 for the electric motor 220. Thus, in the illustrated example, the Q current error value 328 is derived partly from the desired motor speed value 329.

The D current and Q current error values 326, 328 are provided to respective D current and Q current proportional-integral (PI) controllers 330, 332. Each PI controller 330, 332 outputs a D/Q voltage control value 334, 336, and is arranged to adjust the output voltage value 334, 336 in response to the received error value 326, 328 such that drive signals 215 provided to the electric motor 220 are adjusted to reduce the difference between the respective rotating reference frame value 314, 316 and desired current value 322, 324. The D voltage control value 334 and Q voltage control value 336 are provided to an inverse transformation component 338 arranged to perform an inverse transformation of the D and Q rotating reference frame voltage values 334, 336 to orthogonal stationary reference frame voltage values $V_\alpha$ 340 and $V_\beta$ 342, for example using an Inverse Park transformation expressed by equations 11 and 12 below:

$$V_\alpha = V_d * \cos(\theta) - V_q * \sin(\theta) \qquad \text{Equation 11}$$

$$V_\beta = V_q * \cos(\theta) + V_d * \sin(\theta) \qquad \text{Equation 12}$$

In the example illustrated in FIG. 3, the orthogonal stationary reference frame voltage values $V_\alpha$ 340 and $V_\beta$ 342 are provided to a DC bus ripple elimination component 344, which receives an indication 346 of the DC-bus voltage and determines a correct PWM duty cycle for the orthogonal stationary reference frame voltage values $V_\alpha$ 340 and $V_\beta$ 342 based of the measured DC-bus voltage. The DC bus ripple elimination component 344 then outputs 'corrected' orthogonal stationary reference frame voltage values $V_\alpha$ 348 and $V_\beta$ 350 to a space vector modulation (SVM) component 352. The SVM component 352 is arranged to perform an inverse transformation of the corrected (two-axis) orthogonal stationary reference frame voltage values $V_\alpha$ 348 and $V_\beta$ 350 to, in the illustrated example, three-phase stationary reference frame voltage values $V_a$, $V_b$ and $V_c$, for example using an Inverse Clarke transformation expressed by equations 13, 14 and 15 below:

$$V_a = V_\alpha \qquad \text{Equation 13}$$

$$V_b = \frac{-V_\alpha + \sqrt{3} * V_\beta}{2} \qquad \text{Equation 14}$$

$$V_c = \frac{-V_\alpha - \sqrt{3} * V_\beta}{2} \qquad \text{Equation 15}$$

3-phase inverter controls signals are then output, at 354, by the SVM component 352 in accordance with the three-phase stationary reference frame voltage values $V_a$, $V_b$ and $V_c$.

In the example illustrated in FIG. 3, a Q Voltage Limit signal 356 represents the maximum available Q voltage which can be applied. The Q Voltage Limit value 356 is used for limiting the Q voltage control value 336 output by the Q current PI controller 332 and is given by Equation 5 above, i.e. the square root of the subtraction of squares of the maximum applicable drive voltage ($V_{drive}$) and the D current PI controller output 334 ($u_d$); where the D current PI controller's output 334 is limited to the maximum applicable drive voltage. The absolute value of the Q voltage control value 336 output by the Q current PI controller 332 is subtracted from the Q voltage limit 356. Such subtraction generates an indication 357 of how close the Q voltage control value 336 is to its limit. The closer the Q voltage control value 336 is to its limit, the lower the result of the subtraction. The resulting value 357 is then subtracted from the absolute value of the Q current error 328 to generate the bus voltage feedback signal 250. By appropriate relative scaling of the values 356, 336 and 328 (noting the presence of a subtraction of voltage from current) if the voltage subtraction value 357 is a small value and there is a visible Q current error 328 (indicating that torque is desired), the resulting bus voltage feedback signal 250 will be a positive value, indicating that an increase in the bus voltage is desired. If it is negative, there is enough voltage reserve for the drive so the voltage on the bus can be reduced.

Thus, in the example illustrated in FIG. 3, the bus voltage feedback signal 250 is derived from the Q current error value 328, which in turn is derived from the measured Q current value 316 and the desired Q current 324 (which is itself derived from the desired motor speed value 329 and the measured speed value 331 for the electric motor 220), and the Q voltage control value 336. It will be appreciated that the bus voltage feedback signal 250 is not limited to being derived from the Q current error value 328 and the corresponding Q voltage control value 336, and various alternative implementations for deriving the bus voltage feedback signal 250 are contemplated. For example, it is contemplated that the bus voltage feedback signal 250 may be derived based on one or more of:

- a current error value for the electric motor drive signals 215;
- a desired current value for the electric motor drive signals 215;
- a measured current value for the electric motor drive signals 215;
- a voltage control value for the electric motor drive signals 215;
- a measured speed value for the electric motor 220; and/or
- a desired speed value for the electric motor 220.

The bus voltage feedback signal 250 is provided to the PFC controller module 362. In the embodiment illustrated in FIG. 3, a bus voltage PI controller 366 is arranged to receive the bus voltage feedback signal 250 and increase or decrease its output 368 (with the intention of achieving a zero value bus voltage feedback signal 250 through regulation of the voltage level of the bus voltage signal 235). For example, if the bus voltage feedback signal 250 comprises a positive value, the bus voltage PI controller 366 will increase the output signal value 368, and if the bus voltage feedback signal 250 comprises a negative value, the bus voltage PI controller 366 will decrease the output signal value 368.

A desired bus voltage signal 370 is generated from the output signal 368 of the bus voltage PI controller 366. A PFC Control block 369 ensures that the desired bus voltage signal 370 remains within a valid range. For example in case of PFC (Power Factor Correction), the output voltage level should be slightly above the AC input voltage and should not be higher than the maximum allowed voltage level. The desired bus voltage signal 370 is profiled by the Voltage ramp block 372 to avoid step changes and outputs a profiled desired voltage signal 374. Simultaneously, the DC bus voltage is measured, forming a signal 346 which is filtered to suppress noise from the signal. A measured bus voltage signal 376 is mixed with the profiled desired voltage signal 374 resulting in a bus voltage error signal 378.

The bus voltage error signal 378 is processed by the voltage PI controller 380 resulting in a desired current amplitude signal 382. In the illustrated example, a feedforward current 384 (derived from the motor power) is mixed with the desired current amplitude signal 382 output by the voltage PI controller 380 to improve the system control, resulting in a current amplitude control signal 386. At the same time the system measures the supply voltage 240 to determine its frequency and phase using a simple phase lock loop approach which results in an actual angle of the supply voltage. Taking the sine of this angle and multiplying it with the current amplitude control signal 386, the desired current phase locked to the supply voltage phase is obtained, resulting in a phase locked desired current signal 388. A difference between a measured PFC current value 390 and the phase locked desired current signal 388 generates an error signal 392 which is input to a PFC current PI controller 394. The PFC current PI controller 394 outputs the control signal 364 to the PFC regulator unit 360 based on the error signal 392.

Advantageously, by regulating the voltage level of the bus voltage signal 235 in response to the bus voltage feedback signal 250 output by the motor driver component 210 better flexibility of the motor control application can be achieved. In particular, by implementing such a feedback signal between the motor driver component 210 and the voltage converter component 230, the voltage converter component 230 is able to adapt the voltage level of the bus voltage signal 235 in accordance with the requirements of the drive signal 215, less-extreme pulse-width modulation is desired within the drive signal 215, reducing rippling and distortion within the drive signal 215. Significantly, by reducing the current rippling within the drive signal 215 for the electric motor, the torque generated by the electric motor is smoother, enabling a smoother speed to be achieved with fewer vibrations.

Furthermore, by enabling the voltage level of the bus voltage signal 235 to be increased, a higher voltage level for the drive signal 215 may be achieved in order to increase the speed of the electric motor without the need for field weakening. As such, increased speed can be achieved without reducing torque, and without an increase in thermal losses within the electric motor.

Referring now to FIGS. 6 through 10, there are illustrated simplified flowcharts 600 of an example embodiment of a method of generating the drive signals 215 for the electric motor 220.

Figure 6:
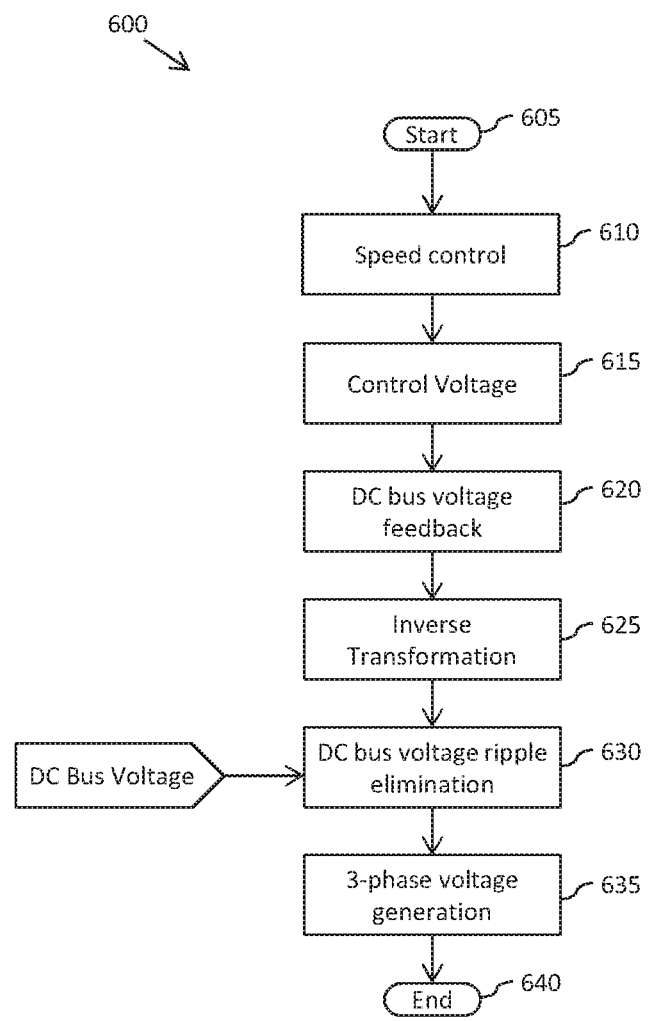
FIGS. 6 through 10 illustrate simplified flowcharts of an example embodiment of a method of generating drive signals for an electric motor.
Figure 7:
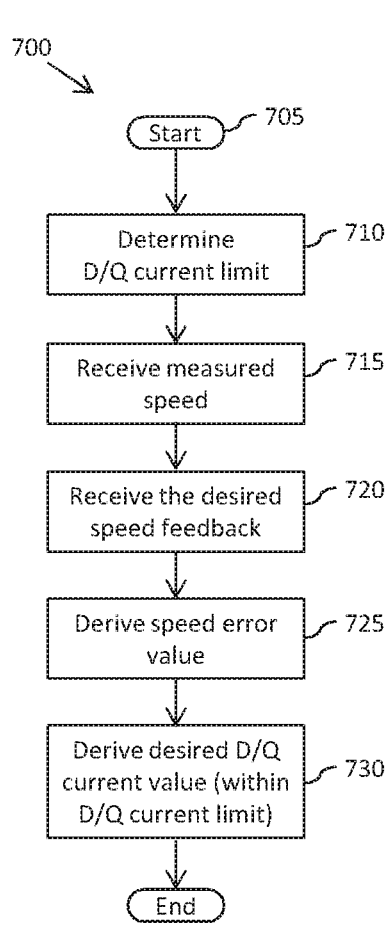

Referring first to FIG. 6, there is illustrated a first part of the method. This first part of the method starts at 605 in FIG. 6 and moves on to 610 where in the illustrated example a speed control function derives desired Q and D current values for the electric motor 220 at 610. In the example illustrated in FIG. 6, a single speed control function is illustrated for deriving both the Q and D current values. However, in some alternative examples separate speed control functions may be used for deriving the desired Q and D current values separately. An example of such a speed control function for deriving the desired Q and D current values is illustrated by FIG. 7 and starts at 705. A current limit used to ensure a requested D/Q current (e.g. the desired Q current value 324 illustrated in FIG. 3) does not exceed an achievable value is determined at 710. In addition, for the example implementation illustrated in FIG. 3, such a Q current limit prevents the speed PI controller 325 'winding-up' by implementing a limit for the desired Q current value 324 output thereby. Such a Q current limit may be computed based on, for example, Equation 6 above.

Having determined the current limit, the method moves on to 715 where a speed measurement value is received, such as the speed measurement value 331 illustrated in FIG. 3. A desired speed value is then determined, at 720, such as the desired speed value 329 in FIG. 3. In the illustrated example, a speed error value is then derived at 725 based on the received speed measurement value and the determined desired speed value, such as the speed error value 327 in FIG. 3. A desired current value, such as the desired Q current value 324 illustrated in FIG. 3, is then derived at 730 based on the derived speed error value and limited by the determined current limit value.

Figure 8:
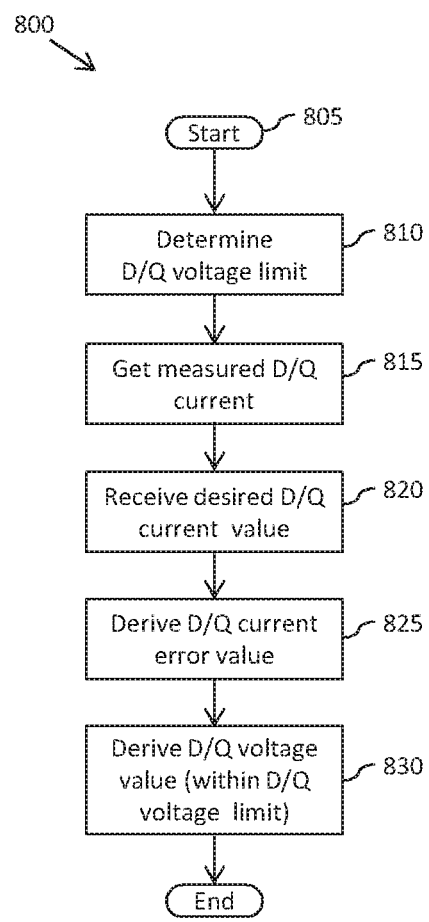

Referring back to FIG. 6, a control voltage function derives Q and D voltage control values at 615. In the example illustrated in FIG. 6, a single control voltage function is illustrated for deriving both the Q and D control voltage values. However, in some alternative examples separate control voltage functions may be used for deriving the Q and D control voltage values separately. An example of such a control voltage function is illustrated in FIG. 8 and starts at 805. A voltage limit is determined at 810. For example, such a voltage limit may be set equal to the value of a measured DC bus voltage, or it may be reduced to a certain portion of the DC bus voltage in conformance to the application needs. The voltage limit is used to ensure a resulting voltage control value does not exceed an achievable level. In addition, in the example implementation illustrated in FIG. 3 such a voltage limit prevents the D/Q PI controllers 330, 332 'WINDING-up' by implementing a limit for the voltage control value 334, 336 output thereby. Continuing at 815, a measured current value, such as the D current $I_d$ 314 and/or Q current value $I_q$ 316 in FIG. 3, is obtained. The desired current value derived by the speed control function at 615 is obtained at 820. The measured current value and the desired current value are then mixed at 825 to derive a current error value, such as the D current error value 326 and/or Q current error value 328 in FIG. 3. The current error value then used to calculate a voltage control value at 830 within the voltage limit determined at 810. For example, in FIG. 3 the D and Q current error values 326, 328 are input to respective PI controllers 330, 332 which generate the respective D and Q voltage control values 334, 336 based on the received current error values 326, 328.

Figures 9, 10:
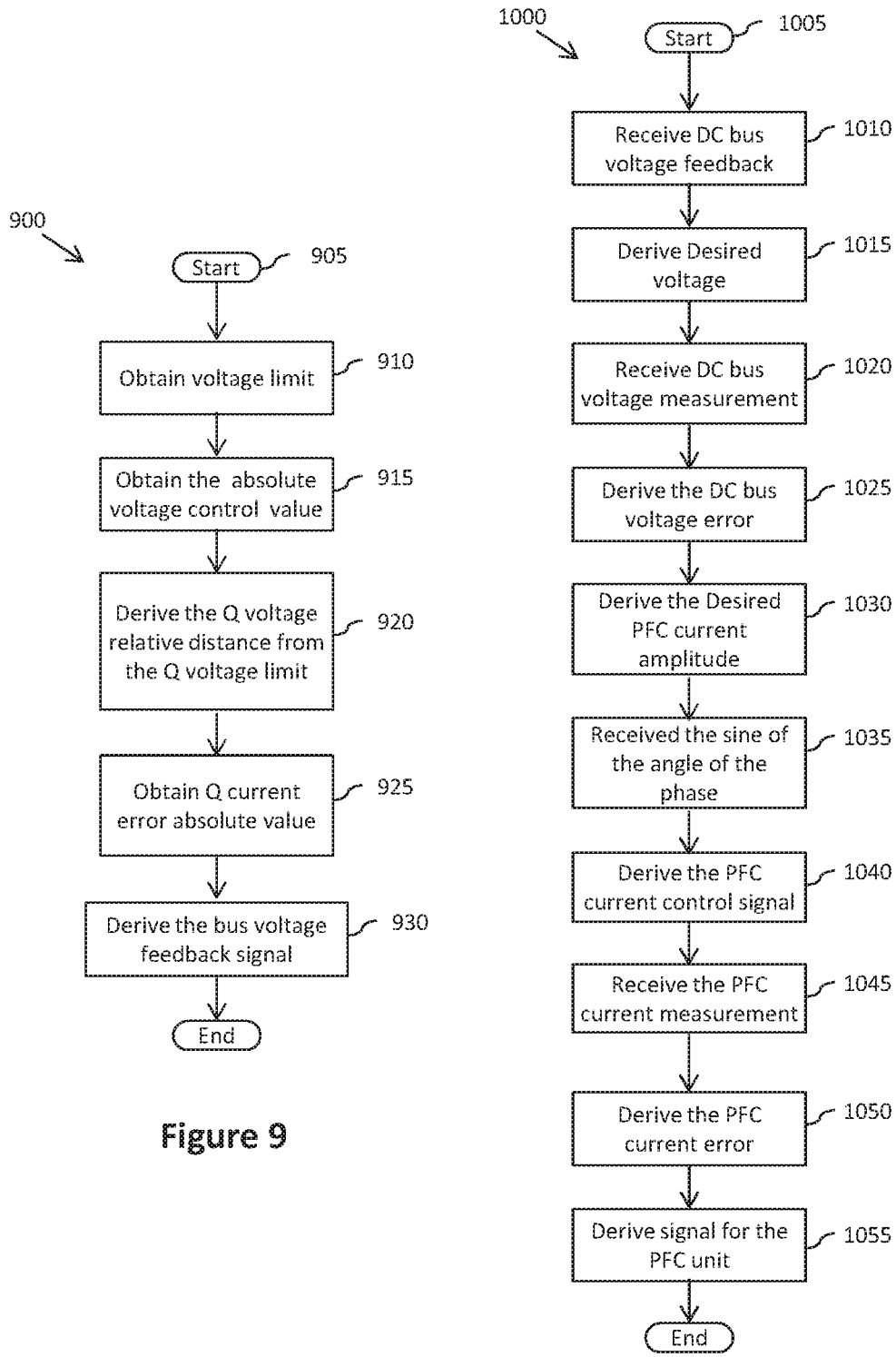

Referring back to FIG. 6, a bus voltage feedback function generates a bus voltage feedback signal at 620. An example of such a bus voltage feedback function is illustrated in FIG. 9 and starts at 905. A voltage limit (such as derived at 810) is obtained at 910, for example such as the Q voltage limit 356 in FIG. 3 which may be calculated using Equation 5 above. An absolute value for a voltage control value (for example the Q voltage control value 328 in FIG. 3) is derived at 915. This absolute voltage control value is subtracted from the voltage limit at 920 to obtain a relative distance indication (e.g. 357 in FIG. 3) of the (absolute) voltage control value from the voltage limit. An absolute value for a current error value (e.g. the Q current error 328 in FIG. 3) between a desired current value and a measured current value is obtained at 925. At 930, the relative distance indication derived at 920 is subtracted from the absolute current error value to generate the bus voltage feedback signal 250 output to, in the example illustrated in FIG. 3, the PFC controller module 362.

Referring back to FIG. 6, in the illustrated example an inverse transformation function performs an inverse transformation of the control voltage values derived at 615 from rotating reference frame voltage values (334, 336 in FIG. 3) to orthogonal stationary reference values (340, 342 in FIG. 3), at 625. At 630 DC bus voltage ripple elimination function receives the orthogonal stationary reference values generated at 625 and an indication of the DC-bus voltage and determines a correct PWM duty cycle for the orthogonal stationary reference frame voltage values based of the measured DC-bus voltage. The DC bus ripple elimination function then outputs corrected orthogonal stationary reference frame voltage values. A space vector modulation (SVM) function performs an inverse transformation of the corrected (two-axis) orthogonal stationary reference frame voltage values, at 635, to derive, for example, three-phase stationary reference frame voltage values, and to output 3-phase inverter controls signals to the electric motor in accordance with the derived three-phase stationary reference frame voltage values.

Referring now to FIG. 10, there is an illustrated simplified flowchart 1000 of a further part of the method of generating the drive signals 215 for the electric motor 220. This part of the method starts at 1005 in FIG. 10 and moves on to 1010 where the reception of the DC bus voltage feedback signal 250 generated at 620 is received. A desired bus voltage signal (e.g. 374 in FIG. 3) is then derived, at 1015, based on the received DC bus voltage feedback signal 250. For example, and as illustrated in FIG. 3, the bus voltage feedback signal 250 may be fed as an error value into a PI controller 366 which increases or decreases its output 368 (with the intention of achieving a zero value bus voltage feedback signal 250 through regulation of the voltage level of the bus voltage signal 235) depending on the bus voltage feedback signal 250. The output 368 of the PI controller may then be used to generate the desired bus voltage signal). PFC may be implemented to ensure that the desired bus voltage signal remains within a valid range, and the desired bus voltage signal may be profiled (for example by a ramp function) to avoid step changes.

A measured DC bus voltage signal (e.g. 376 in FIG. 3) is received at 1020, and mixed with the desired bus voltage signal at 1025 to derive a DC bus voltage error value (e.g. 378 in FIG. 3). The DC bus voltage error value is then used to derive a desired current amplitude signal at 1030. For example, in FIG. 3 the error signal is processed by the voltage PI controller 380 to derive the desired (power factor corrected) current amplitude signal 382. In the example illustrated in FIG. 10, a feedforward current (e.g. 384 in FIG. 3) is received at 1035. The received feedforward current is mixed with the desired current amplitude signal at 1040 to derive a current amplitude control signal (e.g. 386 in FIG. 3).

A measured PFC current is received at 1045. The current amplitude control signal and the measured PFC current are mixed at 1050 to derive a PFC current error signal (e.g. 392 in FIG. 3). This PFC current error signal is then used to derive a DC bus voltage regulator control signal at 1055. For example, in FIG. 3 the PFC current error signal 392 is input to the PFC current PI controller 394 which outputs the (PWM) control signal 364 to drive the PFC regulator unit 360.

As previously mentioned, the invention may at least in part be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories;

MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. For example, the invention has been described in relation to an electric motor drive apparatus comprising a motor driver component arranged to generate a 3-phase drive signal. However it will be appreciated that in alternative example embodiments the motor driver component may be arranged to generate a drive signal for any number of phases, and in particular it is contemplated that the motor driver component may be arranged to generate one or more of:

a multi-phase drive signal;
a single phase drive signal; and
a DC drive signal.

Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. An electric motor drive apparatus comprising:
a voltage converter component arranged to receive a supply voltage signal;

a motor driver component, the motor driver component is arranged to:
receive a bus voltage signal and generate at least one drive signal for an electric motor from the bus voltage signal, the at least one drive signal provided to an inverter circuit connected to the electric motor; wherein:
the motor driver component is arranged to output a bus voltage feedback signal directly to a bus voltage proportional-integral (PI) controller of the voltage converter component wherein the bus voltage feedback signal is derived from a maximum voltage control value for the at least one electric motor drive signal; and wherein the bus voltage feedback signal is further derived from a current error value for the at least one electric motor drive signal and a voltage control value for the at least one electric motor drive signal output by a current PI controller, the current error value being a difference between a desired current value and a measured current value for the at least one electric motor drive signal, the desired current output by a speed PI controller which adjusts the desired current output in response to a motor speed error value defined by mixing a desired speed value of the electric motor and measured speed value of the electric motor, wherein the current PI controller receives as input the current error value;
a power factor correction component coupled between the voltage converter component and the inverter circuit, the power factor correction component arranged to output a bus voltage signal to the inverter circuit;
the voltage converter component is arranged to regulate a voltage level of the bus voltage signal based on the bus voltage feedback signal mixed with the bus voltage signal output by the power factor correction component.

2. The electric motor drive apparatus of claim 1, wherein the motor driver component is arranged to output the bus voltage feedback signal comprising an indication of a power aspiration for the at least one electric motor drive signal.

3. The electric motor drive apparatus of claim 2, wherein the voltage converter component is arranged to:
increase the voltage level of the bus voltage signal upon the bus voltage feedback signal indicating an increased power aspiration for the at least one electric motor drive signal; and
decrease the voltage level of the bus voltage signal upon the bus voltage feedback signal indicating a reduced power aspiration for the at least one electric motor drive signal.

4. The electric motor drive apparatus of claim 1, wherein the motor driver component is arranged to perform pulse-width modulation of the bus voltage signal to generate the at least one electric motor drive signal.

5. The electric motor drive apparatus of claim 1, wherein the motor driver component is arranged to generate at least one of:
multi-phase drive signal;
a single phase drive signal; and
a DC drive signal.

6. The electric motor drive apparatus of claim 1, wherein the voltage converter component is arranged to:

derive a desired current amplitude signal for the bus voltage signal based at least partly on the bus voltage feedback signal;
receive a measured current value for the bus voltage signal;
derive a current error value for the bus voltage signal based at least partly on the desired current amplitude signal for the bus voltage signal and the measured current value for the bus voltage signal; and
regulate the voltage level of the bus voltage signal based on the derived current error value.

7. The electric motor drive apparatus of claim 6, wherein the voltage converter component is arranged to:
derive a desired bus voltage signal based at least partly on the bus voltage feedback signal;
receive a measured bus voltage signal;
derive a bus voltage error signal based at least partly on the desired bus voltage signal and the measured bus voltage signal;
derive the desired current amplitude signal for the bus voltage signal based at least partly on the bus voltage error signal.

8. The electric motor drive apparatus of claim 1, wherein the voltage converter component is arranged to perform power factor correction on the regulated bus voltage signal.

9. The electric motor drive apparatus of claim 8, wherein the motor control module is further arranged to output the bus voltage feedback signal.

10. The electric motor drive apparatus of claim 1 wherein the at least one control signal is a multi-phase control signal.

11. The electric motor drive apparatus of claim 1 wherein the voltage converter component comprises:
a voltage regulator unit arranged to receive the supply voltage signal and to generate therefrom the regulated bus voltage signal; and
a controller module arranged to receive the bus voltage feedback signal and to control the voltage regulator unit to regulate the voltage level of the bus voltage signal based at least partly on the bus voltage feedback signal.

12. The electric drive motor apparatus of claim 1, wherein the bus voltage feedback signal is determined by the motor driver component based on the maximum voltage control value being mixed with an absolute value of the voltage control value to produce a mixed maximum voltage control value and the mixed maximum voltage control value being mixed with an absolute value of the current error value to produce the bus voltage feedback signal.

13. A method of generating at least one drive signal for an electric motor, the method comprising:
generating a bus voltage feedback signal indicative of a power aspiration for the at least one electric motor drive signal, wherein the bus voltage feedback signal is derived from a maximum voltage control value for the at least one electric motor drive signal;
generating a bus voltage signal in a power factor correction component coupled between a voltage converter and an inverter circuit;
regulating a voltage level of the bus voltage signal based at least partly on the bus voltage feedback signal mixed with the bus voltage signal;
generating at least one current feedback signal indicative of a current of the at least one electric motor drive signal;
generating at least one control signal based on the at least one current feedback signal;
providing the at least one control signal to the inverter circuit; and generating the at least one electric motor drive signal from the regulated bus voltage signal and the at least one control signal, the at least one drive signal provided to the inverter circuit connected to the electric motor;

and wherein the bus voltage feedback signal is further derived from a current error value for the at least one electric motor drive signal and a voltage control value for the at least one electric motor drive signal output by a current proportional-integral (PI) controller, the current error value being a difference between a desired current value and a measured current value for the at least one electric motor drive signal, the desired current output by a speed PI controller which adjusts the desired current output in response to a motor speed error value defined by mixing a desired speed value of the electric motor and measured speed value of the electric motor, wherein the current PI controller receives as input the current error value, the bus voltage feedback signal is provided by a motor driver component directly to a bus voltage PI controller of the voltage converter.

14. The method of claim 13, wherein the method comprises:

increasing the voltage level of the bus voltage signal upon the bus voltage feedback signal indicating an increased power aspiration for the at least one electric motor drive signal; and decreasing the voltage level of the bus voltage signal upon the bus voltage feedback signal indicating a reduced power aspiration for the at least one electric motor drive signal.

15. The method of claim 13, wherein the bus voltage feedback signal is determined based on the maximum voltage control value being mixed with an absolute value of the voltage control value to produce a mixed maximum voltage control value and the mixed maximum voltage control value being mixed with an absolute value of the current error value to produce the bus voltage feedback signal.

\* \* \* \* \*